United States Patent
Li et al.

(10) Patent No.: US 6,961,715 B1
(45) Date of Patent: Nov. 1, 2005

(54) INPUT/OUTPUT BUFFER MANAGED BY SORTED BREAKPOINT HARDWARE/SOFTWARE

(75) Inventors: Stephen (Hsiao Yi) Li, Garland, TX (US); Jonathan Rowlands, Dallas, TX (US); Frank L. Laczko, Sr., Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1300 days.

(21) Appl. No.: 09/652,895

(22) Filed: Aug. 31, 2000

Related U.S. Application Data

(62) Division of application No. 08/850,887, filed on May 2, 1997, now Pat. No. 6,192,427.

(51) Int. Cl.[7] .............................. G06F 3/00
(52) U.S. Cl. ................. 705/52; 705/261; 705/56; 714/34; 700/94
(58) Field of Search ................. 700/94; 381/61; 710/52, 56, 57, 261, 260; 714/34, 35; 712/218, 712/227

(56) References Cited

U.S. PATENT DOCUMENTS

| | | | | |
|---|---|---|---|---|
| 4,675,646 A | * | 6/1987 | Lauer | 340/146.2 |
| 5,053,944 A | * | 10/1991 | Krauskopf | 711/202 |
| 5,249,278 A | * | 9/1993 | Krauskopf | 711/203 |
| 5,644,310 A | * | 7/1997 | Laczko et al. | 341/143 |
| 5,737,516 A | * | 4/1998 | Circello et al. | 714/38 |
| 5,946,352 A | * | 8/1999 | Rowlands et al. | 375/242 |
| 6,035,422 A | * | 3/2000 | Hohl et al. | 714/35 |
| 6,061,655 A | * | 5/2000 | Xue et al. | 704/500 |
| 6,134,652 A | * | 10/2000 | Warren | 712/227 |
| 6,192,427 B1 | * | 2/2001 | Li et al. | 710/52 |
| 6,449,736 B1 | * | 9/2002 | Matt et al. | 714/35 |
| 6,708,326 B1 | * | 3/2004 | Bhattacarya | 717/124 |
| 2002/0194540 A1 | * | 12/2002 | Cheung et al. | 714/34 |
| 2003/0149961 A1 | * | 8/2003 | Kawai et al. | 717/129 |
| 2004/0088462 A1 | * | 5/2004 | Miyake et al. | 710/261 |

* cited by examiner

*Primary Examiner*—Xu Mei
(74) *Attorney, Agent, or Firm*—Robert D. Marshall, Jr.; W. James Brady, III; Frederick J. Telecky, Jr.

(57) ABSTRACT

A data processing device uses a portion of a random access memory as an input buffer for holding a portion of a stream of data which is being processed by a processing unit within the processing device. Various break-point source tasks 801a–n determine discontinuities in the portion of data stored in the input buffer and a sorted list of the addresses of the discontinuities is maintained in breakpoint queue 800. Since the buffer is managed in a FIFO manner, a single breakpoint register 810 is sufficient to monitor addresses as they are provided by an address register 820 for accessing the random access memory. When a breakpoint is detected, the breakpoint queue and the breakpoint register is updated by an update task 802.

13 Claims, 8 Drawing Sheets

INPUT/OUTPUT BUFFER MANAGED BY SORTED BREAKPOINT HARDWARE/SOFTWARE

This is a Divisional application of U.S. application Ser. No. 08/850,887 filed May 2, 1997, now U.S. Pat. No. 6,192,427.

FIELD OF THE INVENTION

This invention relates in general to the field of electronic systems and more particularly to an improved modular audio data processing architecture and method of operation.

BACKGROUND OF THE INVENTION

Audio and video data compression for digital transmission of information will soon be used in large scale transmission systems for television and radio broadcasts as well as for encoding and playback of audio and video from such media as digital compact cassette and minidisc.

The Motion Pictures Expert Group (MPEG) has promulgated the MPEG audio and video standards for compression and decompression algorithms to be used in the digital transmission and receipt of audio and video broadcasts in ISO-11172 (hereinafter the "MPEG Standard"). The MPEG Standard provides for the efficient compression of data according to an established psychoacoustic model to enable real time transmission, decompression and broadcast of CD-quality sound and video images. The MPEG standard has gained wide acceptance in satellite broadcasting, CD-ROM publishing, and DAB. The MPEG Standard is useful in a variety of products including digital compact cassette decoders and encoders, and minidisc decoders and encoders, for example. In addition, other audio standards, such as the Dolby AC-3 standard, involve the encoding and decoding of audio and video data transmitted in digital format.

The AC-3 standard has been adopted for use on laser disc, digital video disk (DVD), the US ATV system, and some emerging digital cable systems. The two standards potentially have a large overlap of application areas.

Both of the standards are capable of carrying up to five full channels plus one bass channel, referred to as "5.1 channels," of audio data and incorporate a number of variants including sampling frequencies, bit rates, speaker configurations, and a variety of control features. However, the standards differ in their bit allocation algorithms, transform length, control feature sets, and syntax formats.

Both of the compression standards are based on psychoacoustics of the human perception system. The input digital audio signals are split into frequency subbands using an analysis filter bank. The subband filter outputs are then downsampled and quantized using dynamic bit allocation in such a way that the quantization noise is masked by the sound and remains imperceptible. These quantized and coded samples are then packed into audio frames that conform to the respective standard's formatting requirements. For a 5.1 channel system, high quality audio can be obtained for compression ratio in the range of 10:1.

The transmission of compressed digital data uses a data stream that may be received and processed at rates up to 15 megabits per second or higher. Prior systems that have been used to implement the MPEG decompression operation and other digital compression and decompression operations have required expensive digital signal processors and extensive support memory. Other architectures have involved large amounts of dedicated circuitry that are not easily adapted to new digital data compression or decompression applications.

An object of the present invention is provide an improved apparatus and methods of processing MPEG, AC-3 or other streams of data.

Other objects and advantages will be apparent to those of ordinary skill in the art having reference to the following figures and specification.

SUMMARY OF THE INVENTION

In general, and in a form of the present invention a data processing device for processing a stream of data is provided which has software routines for managing an input buffer in response to breakpoint interrupts. A portion of memory is designated as in input buffer region for holding a portion of the input data stream and a second portion of memory is designated as a breakpoint queue to hold a sorted list of breakpoint addresses which point to selected locations in the input buffer. A software routine selects an address from the breakpoint queue and loads it into a breakpoint register which is then compared with each address presented to the memory. An interrupt request is generated when a match occurs. A processing unit responds to the interrupt by executing a software routine which interprets the reason for the interrupt an manages the input buffer accordingly. A breakpoint is used to indicate the end of the input buffer region. A break-point is used to delineate different types of data in the input buffer. A breakpoint is used to identify a CRC word. A breakpoint is used to detect buffer underflow and overflow.

In another form of the invention, a second breakpoint register and comparator is provided so that read and write breakpoints can be distinguished. A read pointer and a write pointer which point to the beginning of data and end of data in the input buffer are maintained in response to breakpoint interrupts.

Other embodiments of the present invention will be evident from the description and drawings.

BRIEF DESCRIPTION OF THE DRAWINGS

Other features and advantages of the present invention will become apparent by reference to the following detailed description when considered in conjunction with the accompanying drawings, in which.

Corresponding numerals and symbols in the different figures and tables refer to corresponding parts unless otherwise indicated.

DETAILED DESCRIPTION OF THE INVENTION

Aspects of the present invention include methods and apparatus for processing and decompressing an audio data stream. In the following description, specific information is set forth to provide a thorough understanding of the present invention. Well known circuits and devices are included in block diagram form in order not to complicate the description unnecessarily. Moreover, it will be apparent to one skilled in the art that specific details of these blocks are not required in order to practice the present invention.

The present invention comprises a system that is operable to efficiently decode a stream of data that has been encoded and compressed using any of a number of encoding standards, such as those defined by the Moving Pictures Expert Group (MPEG-1 or MPEG-2), or the Digital Audio Compression Standard (AC-3), for example. In order to accomplish the real time processing of the data stream, the system of the present invention must be able to receive a bit stream that can be transmitted at variable bit rates up to 15 megabits per second and to identify and retrieve a particular audio data set that is time multiplexed with other data within the bit stream. The system must then decode the retrieved data and present conventional pulse code modulated (PCM) data to a digital to analog converter which will, in turn, produce conventional analog audio signals with fidelity comparable to other digital audio technologies. The system of the present invention must also monitor synchronization within the bit stream and synchronization between the decoded audio data and other data streams, for example, digitally encoded video images associated with the audio which must be presented simultaneously with decoded audio data. In addition, MPEG or AC-3 data streams can also contain ancillary data which may be used as system control information or to transmit associated data such as song titles or the like. The system of the present invention must recognize ancillary data and alert other systems to its presence.

Figure 1:
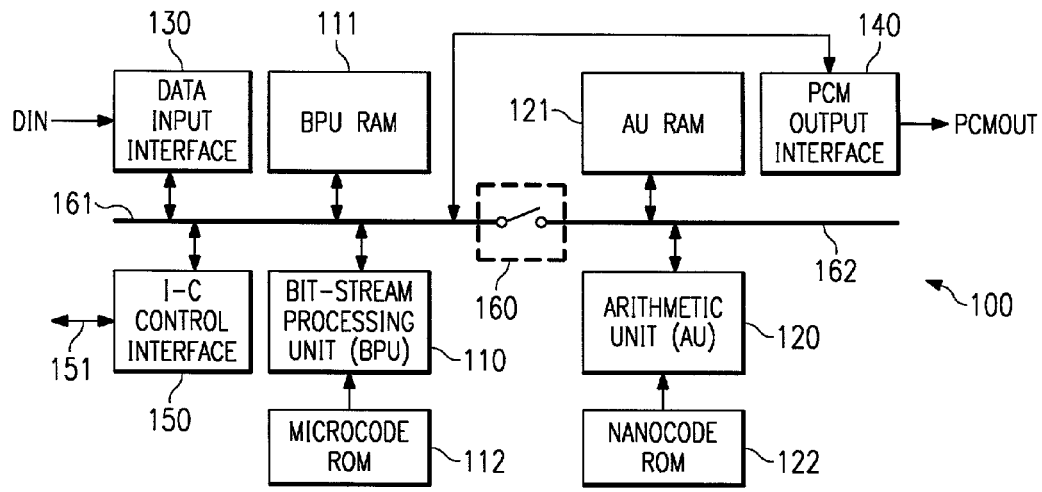
FIG. 1 is a block diagram of a data processing device constructed in accordance with aspects of the present invention.

In order to appreciate the significance of aspects of the present invention, the architecture and general operation of a data processing device which meets the requirements of the preceding paragraph will now be described. Referring to FIG. 1, which is a block diagram of a data processing device 100 constructed in accordance with aspects of the present invention, the architecture of data processing device 100 is illustrated. The architectural hardware and software implementation reflect the two very different kinds of tasks to be performed by device 100: decoding and synthesis. In order to decode a steam of data, device 100 must unpack variable length encoded pieces of information from the stream of data. Additional decoding produces set of frequency coefficients. The second task is a synthesis filter bank that converts the frequency domain coefficients to PCM data. In addition, device 100 also needs to support dynamic range compression, downmixing, error detection and concealment, time synchronization, and other system resource allocation and management functions.

The design of device 100 includes two autonomous processing units working together through shared memory supported by multiple I/O modules. The operation of each unit is data-driven. The synchronization is carried out by the Bit-stream Processing Unit (BPU) which acts as the master processor. Bit-stream Processing Unit (BPU) 110 has a RAM 111 for holding data and a ROM 112 for holding instructions which are processed by BPU 110. Likewise, Arithmetic Unit (AU) 120 has a RAM 121 for holding data and a ROM 122 for holding instructions which are processed by AU 120. Data input interface 130 receives a stream of data on input lines DIN which is to be processed by device 100. PCM output interface 140 outputs a stream of PCM data on output lines PCMOUT which has been produced by device 100. Inter-Integrated Circuit ($I^2C$) Interface 150 provides a mechanism for passing control directives or data parameters on interface lines 151 between device 100 and other control or processing units, which are not shown, using a well known protocol. Bus switch 160 selectively connects address/data bus 161 to address/data bus 162 to allow BPU 110 to pass data to AU 120.

Figure 2:
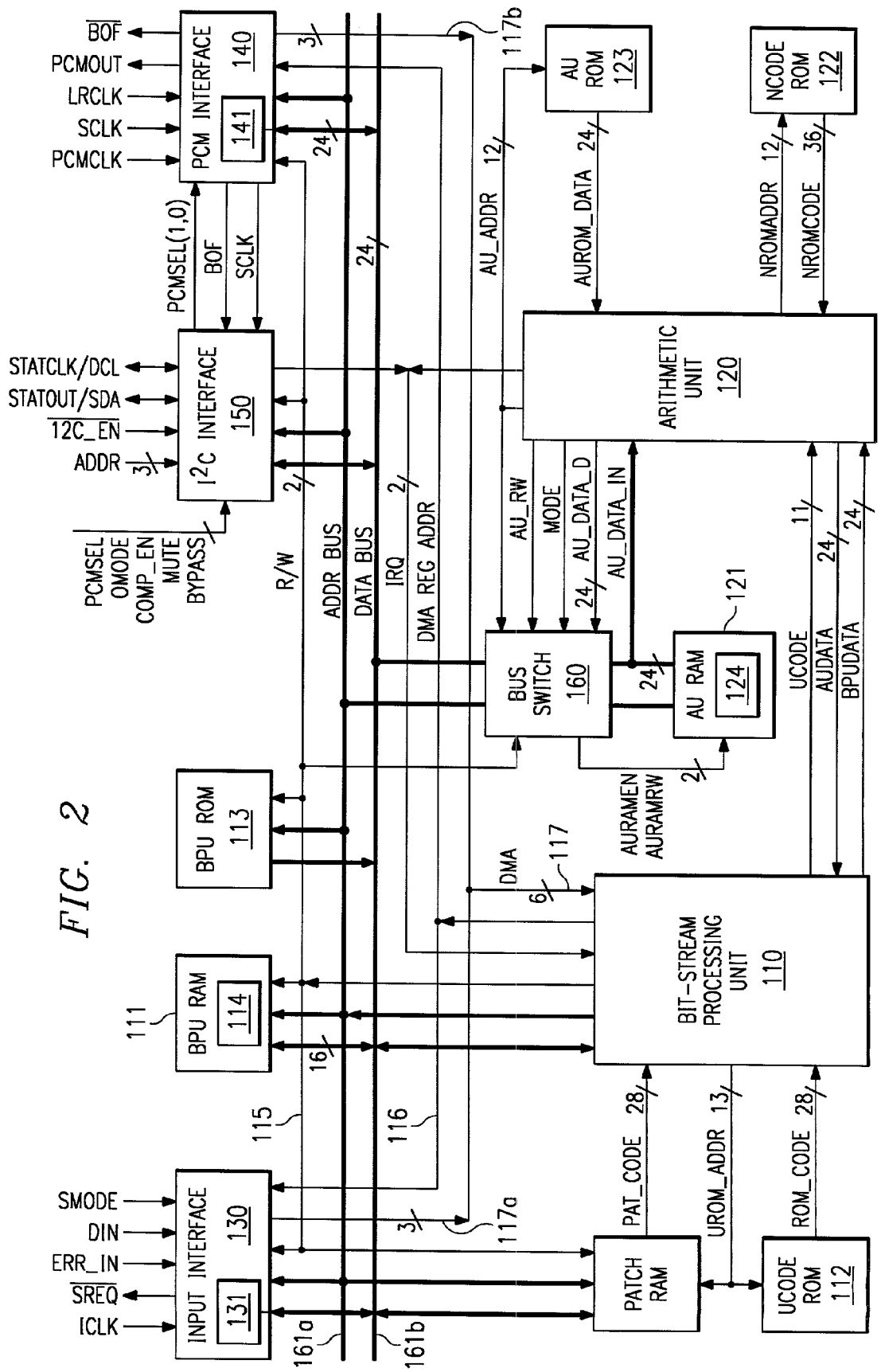
FIG. 2 is a more detailed block diagram of the data processing device of FIG. 1, illustrating interconnections of a Bit-stream Processing Unit and an Arithmetic Unit.

FIG. 2 is a more detailed block diagram of the data processing device of FIG. 1, illustrating interconnections of Bit-stream Processing Unit 110 and Arithmetic Unit 120. A BPU ROM 113 for holding data and coefficients and an AU ROM 123 for holding data and coefficients is also shown.

A typical operation cycle is as follows: Coded data arrives at the Data Input Interface 130 asynchronous to device 100's system clock, which operates at 27 MHz. Data Input Interface 130 synchronizes the incoming data to the 27 MHz device clock and transfers the data to a buffer area 114 in BPU memory 111 through a direct memory access (DMA) operation. BPU 110 reads the compressed data from buffer 114, performs various decoding operations, and writes the unpacked frequency domain coefficients to AU RAM 121, a shared memory between BPU and AU. Arithmetic Unit 120 is then activated and performs subband synthesis filtering, which produces a stream of reconstructed PCM samples which are stored in output buffer area 124 of AU RAM 121. PCM Output Interface 140 receives PCM samples from output buffer 124 through a DMA transfer and then formats and outputs them to an external D/A converter. Additional functions performed by the BPU include control and status I/O, as well as overall system resource management.

Figure 3:
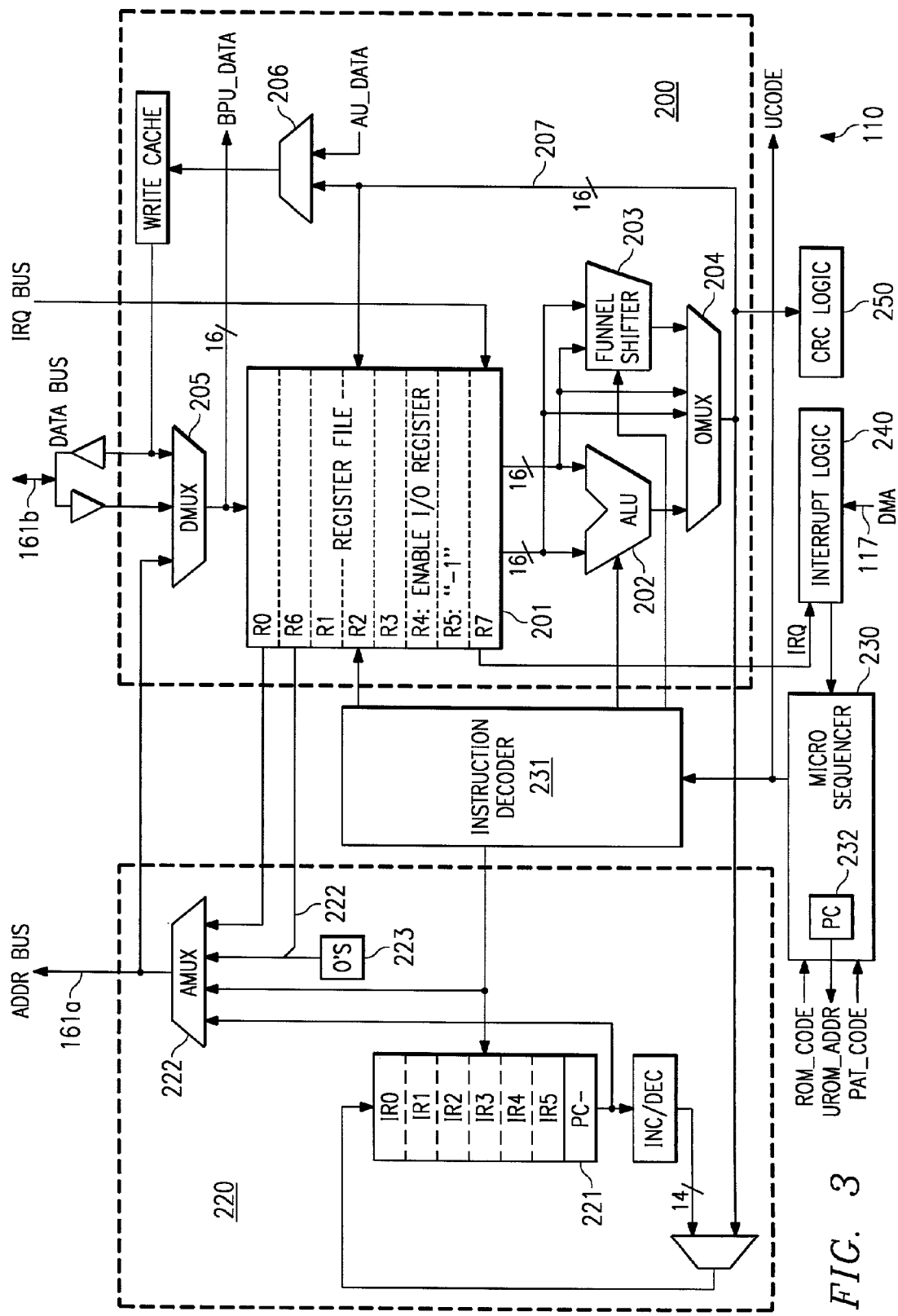
FIG. 3 is a block diagram of the Bit-stream Processing Unit of FIG. 2.

FIG. 3 is a block diagram of the Bit-stream Processing Unit of FIG. 2. BPU 110 is a programmable processor with hardware acceleration and instructions customized for audio decoding. It is a 16-bit reduced instruction set computer (RISC) processor with a register-to-register operational unit 200 and an address generation unit 220 operating in parallel. Operational unit 200 includes a register file 201 an arithmetic/logic unit 202 which operates in parallel with a funnel shifter 203 on any two registers from register file 201, and an output multiplexer 204 which provides the results of each cycle to input mux 205 which is in turn connected to register file 201 so that a result can be stored into one of the registers.

BPU 110 is capable of performing an ALU operation, a memory I/O, and a memory address update operation in one system clock cycle. Three addressing modes: direct, indirect, and registered are supported. Selective acceleration is provided for field extraction and buffer management to reduce control software overhead. Table 1 is a list of the instruction set.

TABLE 1

BPU Instruction Set

| Instruction Mnemonics | Functional Description |
| --- | --- |
| And | Logical and |
| Or | Logical or |
| cSat | Conditional saturation |
| Ash | Arithmetic shift |
| LSh | Logical shift |
| RoRC | Rotate right with carry |
| GBF | Get bit-field |
| Add | Add |
| AddC | Add with carry |
| cAdd | Conditional add |
| Xor | Logical exclusive or |
| Sub | Subtract |
| SubB | Subtract with borrow |
| SubR | Subtract reversed |
| Neg | 2's complement |
| cNeg | Conditional 2's complement |
| Bcc | Conditional branch |
| DBcc | Decrement & conditional branch |
| IOST | IO reg to memory move |
| IOLD | Memory to IO reg move |
| auOp | AU operation - loosely coupled |
| auEx | AU execution - tightly coupled |
| Sleep | Power down unit |

BPU 110 has two pipeline stages: Instruction Fetch/Predecode which is performed in Micro Sequencer 230, and Decode/Execution which is performed in conjunction with instruction decoder 231. The decoding is split and merged with the Instruction Fetch and Execution respectively. This arrangement reduces one pipeline stage and thus branching overhead. Also, the shallow pipe operation enables the processor to have a very small register file (four general purpose registers, a dedicated bit-stream address pointer, and a control/status register) since memory can be accessed with only a single cycle delay.

Figure 4:
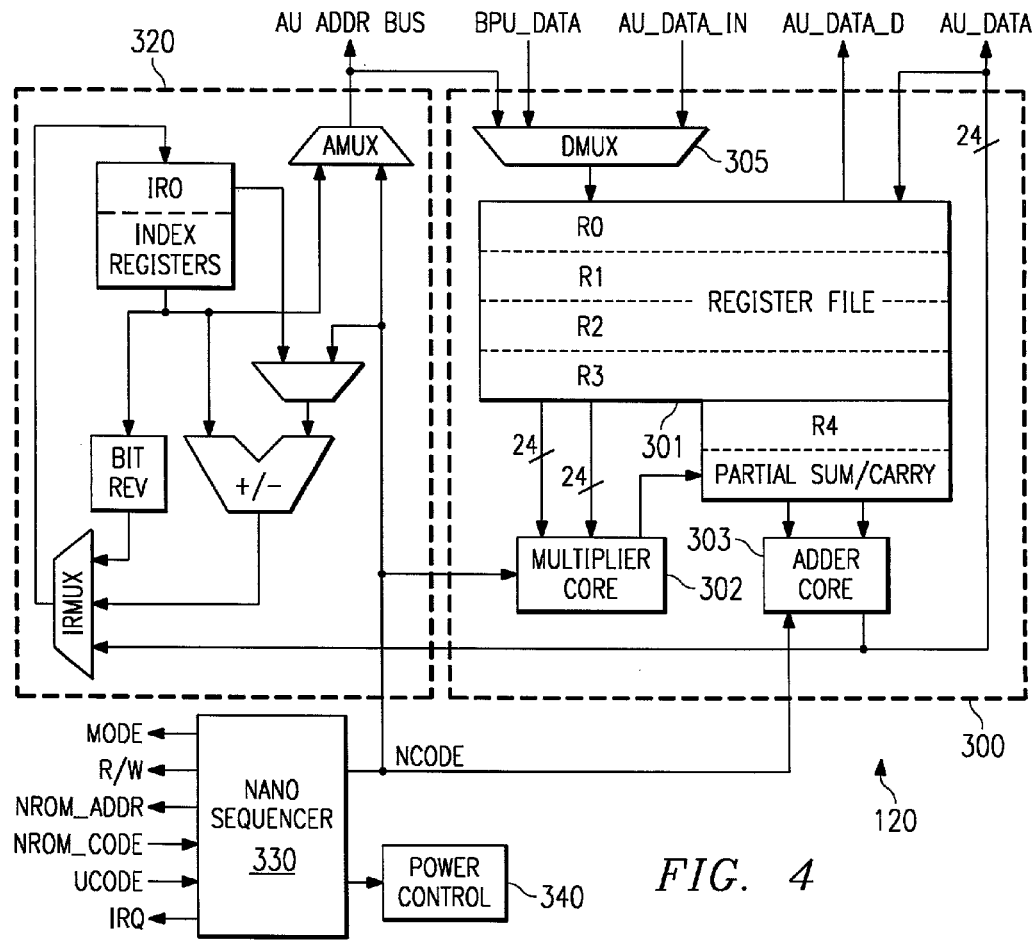
FIG. 4 is a block diagram of the Arithmetic Unit of FIG. 2.

FIG. 4 is a block diagram of the Arithmetic Unit of FIG. 2. Arithmetic unit 120 is a programmable fixed point math processor that performs the subband synthesis filtering. A complete description of subband synthesis filtering is provided in U.S. Pat. No. 5,644,310, (U.S. patent application Ser. No. 08/475,251, entitled Integrated Audio Decoder System And Method Of Operation or U.S. patent application Ser. No. 08/054,768 entitled Hardware Filter Circuit And Address Circuitry For MPEG Encoded Data, both assigned to the assignee of the present application), which is included herein by reference; in particular, FIGS. 7–9 and 11–31 and related descriptions.

The AU 120 module receives frequency domain coefficients from the BPU by means of shared AU memory 121. After the BPU has written a block of coefficients into AU memory 121, the BPU activates the AU through a coprocessor instruction, auOp. BPU 110 is then free to continue decoding the audio input data. Synchronization of the two processors is achieved through interrupts, using interrupt circuitry 240 (shown in FIG. 3).

AU 120 is a 24-bit RISC processor with a register-to-register operational unit 300 and an address generation unit 320 operating in parallel. Operational unit 300 includes a register file 301, a multiplier unit 302 which operates in conjunction with an adder 303 on any two registers from register file 301. The output of adder 303 is provided to input mux 305 which is in turn connected to register file 301 so that a result can be stored into one of the registers.

A bit-width of 24 bits in the data path in the arithmetic unit was chosen so that the resulting PCM audio will be of superior quality after processing. The width was determined by comparing the results of fixed point simulations to the results of a similar simulation using double-precision floating point arithmetic. In addition, double-precision multiplies are performed selectively in critical areas within the subband synthesis filtering process.

Figure 5:
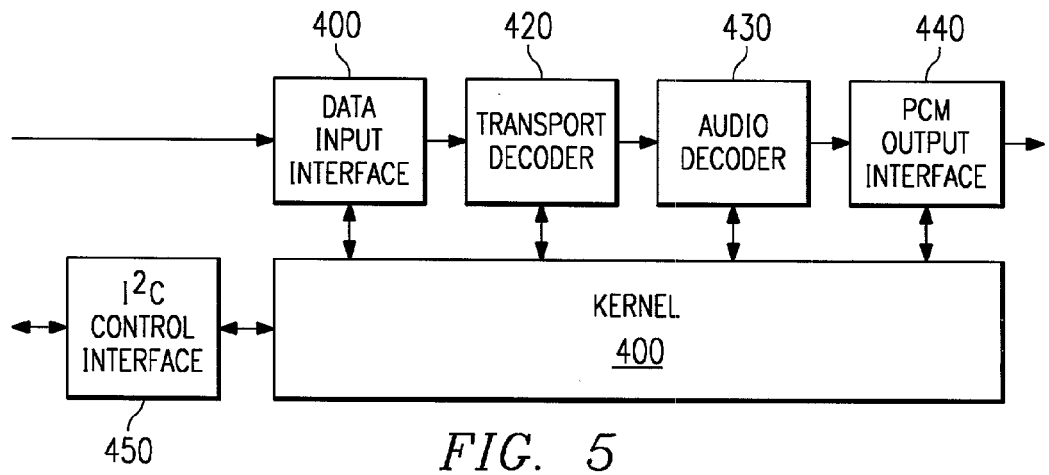
FIG. 5 is a block diagram illustrating the architecture of the software which operates on the device of FIG. 1.

FIG. 5 is a block diagram illustrating the architecture of the software which operates on data processing device 100. Each hardware component in device 100 has an associated software component, including the compressed bit-stream input, audio sample output, host command interface, and the audio algorithms themselves. These components are overseen by a kernel that provides real-time operation using interrupts and software multi-tasking.

The software architecture block diagram is illustrated in FIG. 5. Each of the blocks corresponds to one system software task. These tasks run concurrently and communicate via global memory 111. They are scheduled according to priority, data availability, and synchronized to hardware using interrupts. The concurrent data-driven model reduces RAM storage by allowing the size of a unit of data processed to be chosen independently for each task.

The software operates as follows. Data Input Interface 410 buffers input data and regulates flow between the external source and the internal decoding tasks. Transport Decoder 420 strips out packet information from the input data and emits a raw AC-3 or MPEG audio bit-stream, which is processed by Audio Decoder 430. PCM Output Interface 440 synchronizes the audio data output to a system-wide absolute time reference and, when necessary, attempts to conceal bit-stream errors. I$^2$C Control Interface 450 accepts configuration commands from an external host and reports device status. Finally, Kernel 400 responds to hardware interrupts and schedules task execution.

Figure 6:
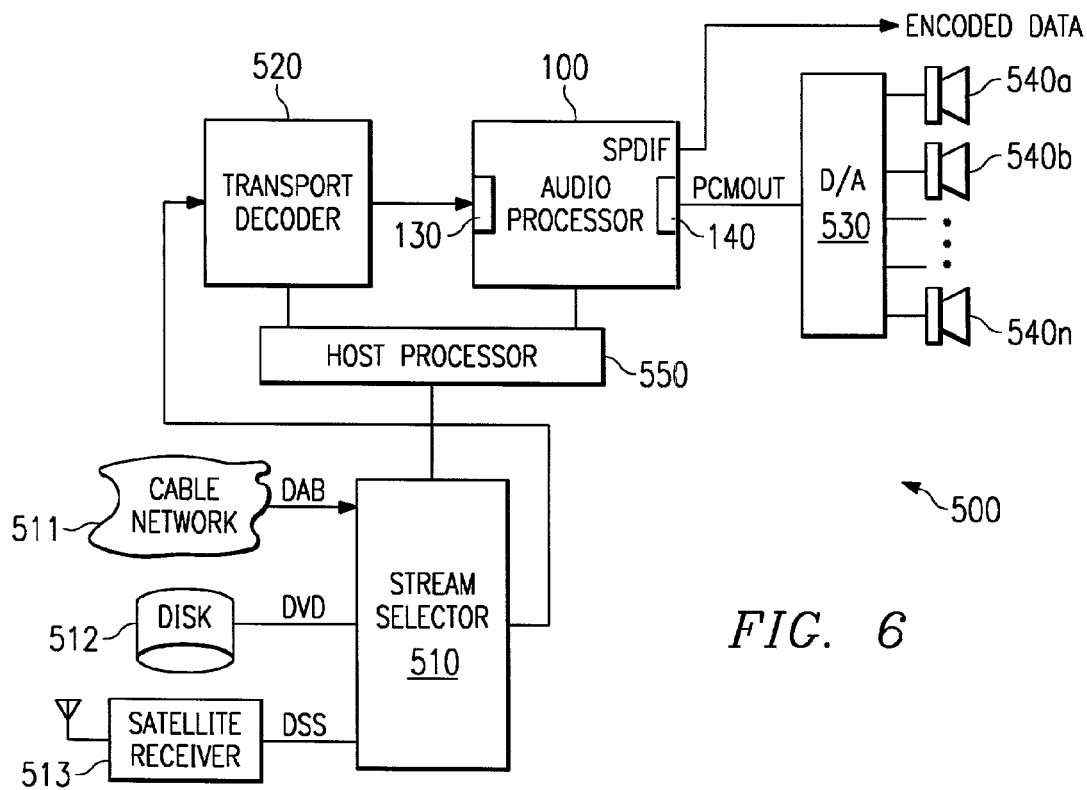
FIG. 6 is a block diagram illustrating an audio reproduction system which includes the data processing device of FIG. 1.

FIG. 6 is a block diagram illustrating an audio reproduction system 500 which includes the data processing device of FIG. 1. Stream selector 510 selects a transport data stream from one or more sources, such as a cable network system 511, digital video disk 512, or satellite receiver 513, for example. A selected stream of data is then sent to transport decoder 520 which separates a stream of audio data from the transport data stream according to the transport protocol, such as MPEG or AC-3, for that stream. Transport decoder typically recognizes a number of transport data stream formats, such as direct satellite system (DSS), digital video disk (DVD), or digital audio broadcasting (DAB), for example. The selected audio data stream is then sent to data processing device 100 via input interface 130. Device 100 unpacks, decodes, and filters the audio data stream, as discussed previously, to form a stream of PCM data which is passed via PCM output interface 140 to D/A device 530. D/A device 530 then forms at least one channel of analog data which is sent to a speaker subsystem 540a. Typically, A/D 530 forms two channels of analog data for stereo output into two speaker subsystems 540a and 540b. Processing device 100 is programmed to downmix an MPEG-2 or AC-3 system with more than two channels, such as 5.1 channels, to form only two channels of PCM data for output to stereo speaker subsystems 540a and 540b.

Alternatively, processing device 100 can be programmed to provide up to six channels of PCM data for a 5.1 channel sound reproduction system if the selected audio data stream conforms to MPEG-2 or AC-3. In such a 5.1 channel system, D/A 530 would form six analog channels for six speaker subsystems 540a–n. Each speaker subsystem 540 contains at least one speaker and may contain an amplification circuit (not shown) and an equalization circuit (not shown).

The SPDIF (Sony/Philips Digital Interface Format) output of device 100 conforms to a subset of the Audio Engineering Society's AES3 standard for serial transmission of digital audio data. The SPDIF format is a subset of the minimum implementation of AES3. This stream of data can be provided to another system (not shown) for further processing or re-transmission.

Figure 7:
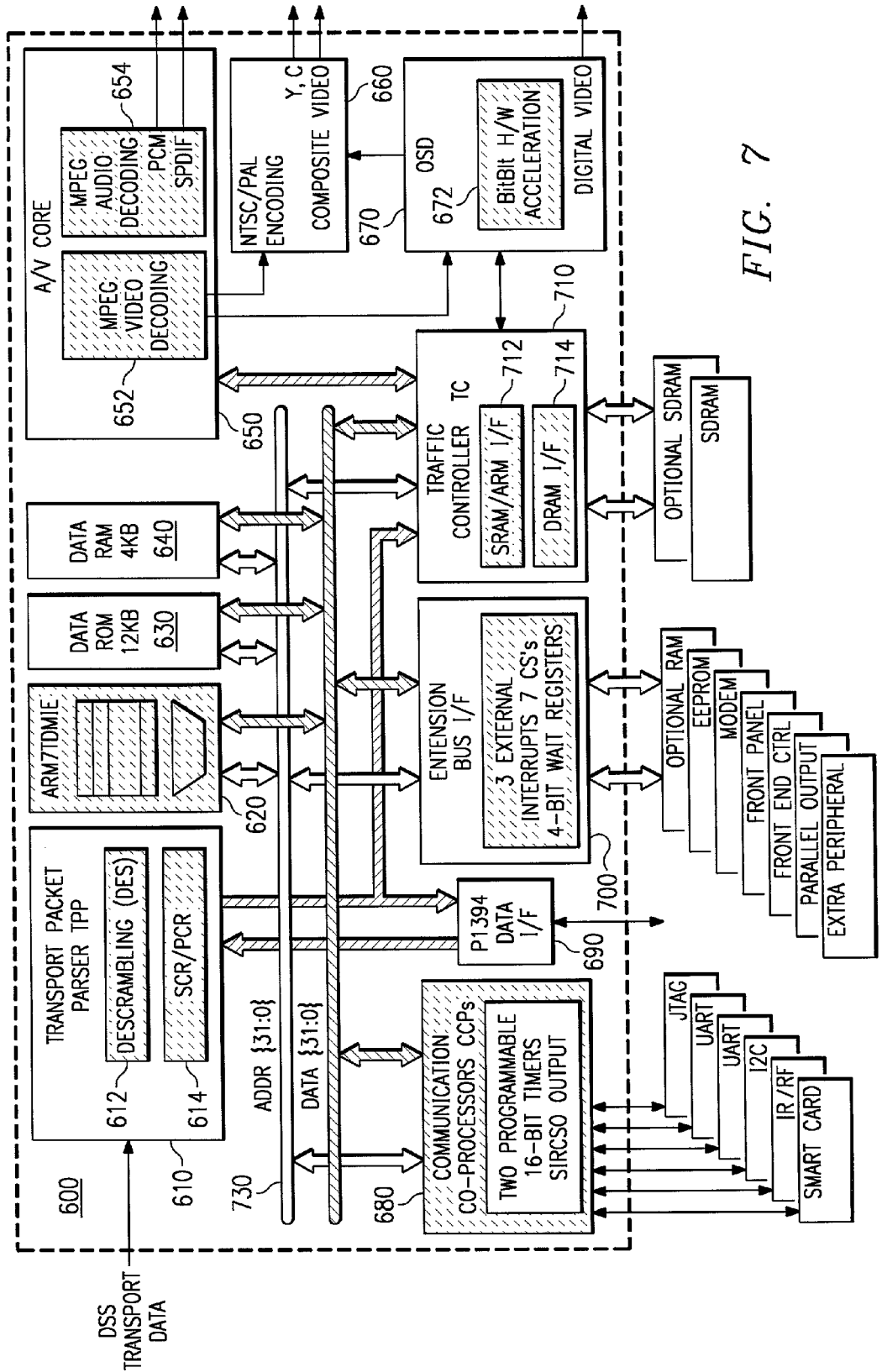
FIG. 7 is a block diagram of an integrated circuit which includes the data processing device of FIG. 1 in combination with other data processing devices, the integrated circuit being connected to various external devices.

Referring now to FIG. 7, there may be seen a functional block diagram of a circuit 300 that forms a portion of an audio-visual system which includes aspects of the present invention. More particularly, there may be seen the overall functional architecture of a circuit including on-chip interconnections that is preferably implemented on a single chip as depicted by the dashed line portion of FIG. 7. As depicted inside the dashed line portion of FIG. 7, this circuit consists of a transport packet parser (TPP) block 610 that includes a bit-stream decoder or descrambler 612 and clock recovery circuitry 614, an ARM CPU block 620, a data ROM block 630, a data RAM block 640, an audio/video (A/V) core block 650 that includes an MPEG-2 audio decoder 654 and an MPEG-2 video decoder 652, an NTSC/PAL video encoder block 660, an on screen display (OSD) controller block 670 to mix graphics and video that includes a bit-blt hardware (H/W) accelerator 672, a communication coprocessor (CCP) block 680 that includes connections for two UART serial data interfaces, infra red (IR) and radio frequency (RF) inputs, SIRCS input and output, an $I^2C$ port and a Smart Card interface, a P1394 interface (I/F) block 690 for connection to an external 1394 device, an extension bus interface (I/F) block 700 to connect peripherals such as additional RS232 ports, display and control panels, external ROM, DRAM, or EEPROM memory, a modem and an extra peripheral, and a traffic controller (TC) block 710 that includes an SRAM/ARM interface (I/F) 712 and a DRAM I/F 714. There may also be seen an internal 32 bit address bus 320 that interconnects the blocks and seen an internal 32 bit data bus 730 that interconnects the blocks. External program and data memory expansion allows the circuit to support a wide range of audio/video systems, especially, as for example, but not limited to set-top boxes, from low end to high end.

The consolidation of all these functions onto a single chip with a large number of communications ports allows for removal of excess circuitry and/or logic needed for control and/or communications when these functions are distributed among several chips and allows for simplification of the circuitry remaining after consolidation onto a single chip. Thus, audio decoder 354 is the same as data processing device 100 with suitable modifications of interfaces 130, 140, 150 and 170. This results in a simpler and cost-reduced single chip implementation of the functionality currently available only by combining many different chips and/or by using special chipsets.

Figure 8:
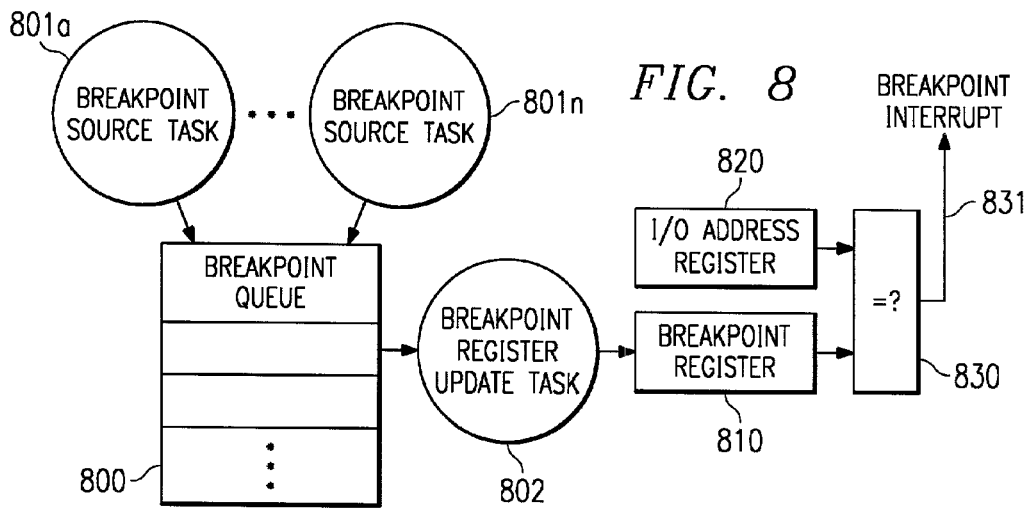
FIG. 8 illustrates data buffer management using breakpoint interrupts, according to an aspect of the present invention.

A novel aspect of data processing device 100 will now be discussed in detail, with reference to FIGS. 8, 9A, 9B, 10 and 11. Input buffer 114 (FIG. 2) is managed by data input interface software module 400 (FIG. 5) using breakpoint interrupts, as illustrated in FIG. 8. PCM output buffer 124 is likewise managed by PCM output interface software 440 using breakpoint interrupts. Hardware interrupts are valuable for signaling events between software tasks in cases where the conditions that cause the event are dispersed throughout the system. Device 110 makes use of interrupts for bit-stream input buffer management. There are many special conditions associated with the input buffer read function, including:

buffer empty
buffer circular wraparound
bit-stream demultiplex boundary
known bit-stream error location These must be tested for each read by BPU 110 from the bit-stream input buffer 114. Due to the necessarily short execution time of the buffer read operation and the large number of different places it is performed, some centralized hardware assist is desirable. In device 110 this takes the form of a single hardware data breakpoint register for the input buffer read function, which generates a hardware interrupt whenever a target address in the input buffer is accessed. The mechanism allows the bit-stream syntax decode and buffer management functions to be largely decoupled, which improves run-time efficiency and software design, maintenance and testing. FIG. 8 illustrates the data breakpoint scheme for the input bit-stream buffer management.

Each of the conditions which might cause a breakpoint interrupt are associated with a different address in the input buffer, and many conditions may be "active" simultaneously. Since the bit-stream input buffer is predominantly accessed in FIFO order, data breakpoint events will in general be triggered in order of increasing address. This allows a single breakpoint register to be used for multiple events, if it always contains the address of the next breakpoint. Software source tasks 801a–n maintain a sorted queue of breakpoint events for this purpose.

Figure 9:
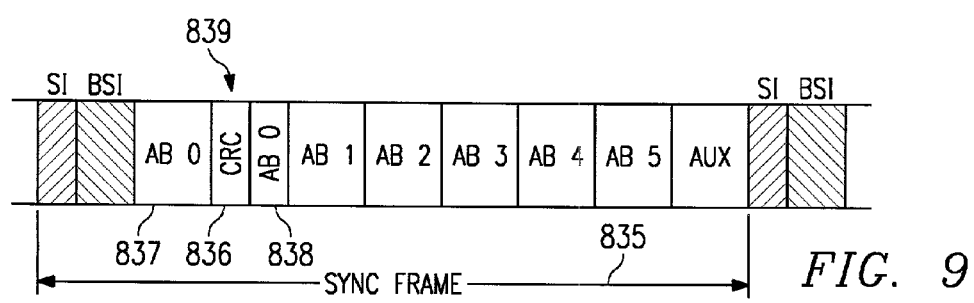
FIG. 9 illustrates an AC-3 sync frame with breakpoint interrupts used to locate a CRC field, according to an aspect of the present invention.

Another advantageous use of a breakpoint interrupt occurs in the Dolby AC-3 algorithm, where CRC words are inserted at fixed bit addresses in each audio frame ("sync block"). Their positions are not related to the bit-stream elements around them, and in fact CRC words will often divide other fields in two, as illustrated in FIG. 9. Sync frame 835 has a CRC field 836 which occurs in the middle of field AB0, dividing it into fields 837 and 838. To avoid extensive software checking on every field unpacking operation, some hardware support is needed. However since the CRC words themselves occur infrequently it is sufficient for the hardware to detect the occurrence of a CRC word and allow software to process it. This is done via an input buffer breakpoint interrupt.

The location of the (possible multiple) CRC words within a sync block can be determined once the sync block header has been parsed by BPU 110. For example, in FIG. 9, location 839 represents the address of CRC field 836 when sync frame 835 is in input buffer 114 (FIG. 2). Referring again to FIG. 8, a breakpoint source task 801 then adds this location to the sorted breakpoint list 800. By setting up breakpoint register 810 which monitors the contents of the input buffer read pointer 820, the microcode engine can be interrupted just before a CRC word is reached. Breakpoint register 810 is maintained by breakpoint register update task 802. Comparison circuitry 830 asserts a breakpoint interrupt on signal line 831. At this time an interrupt routine can check the validity of the CRC, then amend the input buffer and read pointer to effectively delete the CRC word from the input stream.

Still referring to FIG. 8, as discussed above, the input breakpoint interrupt can be used to manage the circular input buffer 114 in BPU RAM 111. This could also be done using the table lookup addressing mode, but in that case the input buffer is restricted to a power of two size. Using the breakpoint interrupt handler to wrap the read pointer allows the size of the buffer to be optimized for the determined worst case buffer conditions. This is done by placing the ending address of buffer 114 in the breakpoint queue. Update task 802 will then place this address in breakpoint register 810 so that an interrupt will occur when the last word in input buffer 114 is accessed.

Figure 10A:
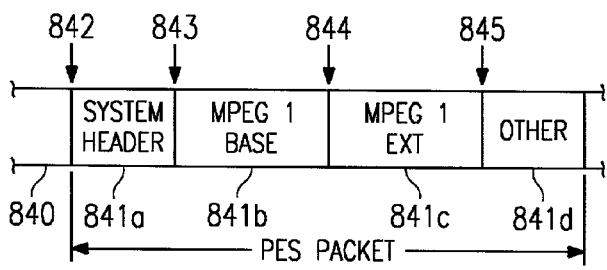
FIGS. 10A, 10B and 10C illustrate MPEG PES packets with breakpoint interrupts used to locate various fields, according to an aspect of the present invention.
Figure 10C:
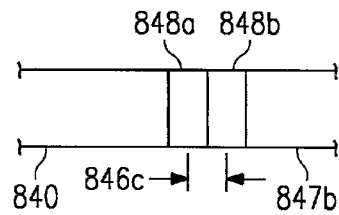
Figure 10B:
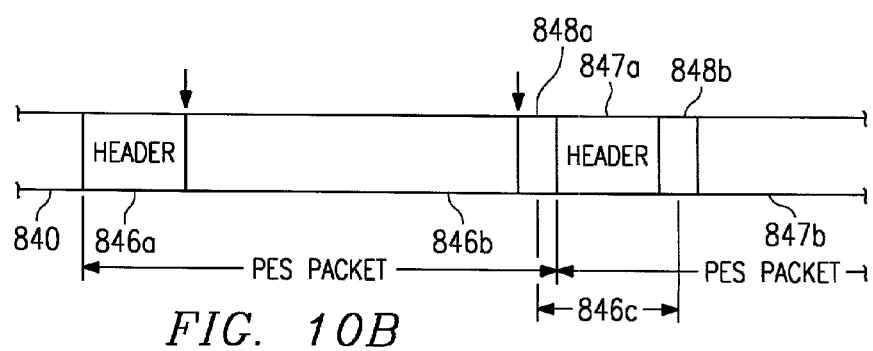

Another advantageous use of breakpoint interrupts is illustrated in FIGS. 10A and 10B, which illustrate various aspects of decoding an MPEG packetized elementary stream (PES) 840. FIG. 10A illustrates aspects of a single PES packet 841a–841d. Breakpoint 842 indicates the beginning of a header 841a. In response to this interrupt, a software routine which decodes PES headers is executed by BPU 110. Breakpoint 843 marks the beginning of MPEG 1 base data 841b. A software routine which decodes MPEG 1 base data is invoked in response to breakpoint 843. Breakpoint 844 marks the beginning of MPEG 1 extension data 841c and invokes a software routine to decode this type of data. Finally, breakpoint 845 marks the beginning of some other type of data 841d and invokes yet another software routine to deal with this type of data. Thus, BPU 110 is operable to form a sorted list of breakpoint addresses 842–845 in memory 111, to load register 810 with a selected breakpoint address from the sorted list, to process data read from input buffer 114 using at least one of a plurality of software routines stored in memory 112, to respond to an interrupt signal asserted by comparison circuit 830, and to select a different one of the software routines for processing the data from input buffer 114 in response to the breakpoint interrupt.

FIG. 10B shows two PES packets 846 and 847 wherein a single data item 846c spans across both packets. Data item 846c is a bit field of two to sixteen bits that is located in data words 848a and 848b. Header 847a of PES packet 847 separates the two data words. In this case, a breakpoint is set to point to word 848a. A breakpoint interrupt handler responds to breakpoint 848a and saves data word 848a. The handler then processes header 847a. The handler then copies the saved data word 848a back into data stream 840 at a location contiguous with data word 848b by overwriting the last word of header 847a, as shown in FIG. 10C. The read pointer is backed up by one word to point to the new location for data word 848a, and processing resumes. Data item 846C is now advantageously extracted from the two data words correctly.

A breakpoint interrupt can also be used to detect an input buffer underflow condition. This requires that a breakpoint source task 801a–n be able to update the breakpoint queue 800 with the position of the end of data in input buffer 114. The conditions for when the breakpoint interrupt should be interpreted as buffer underflow need to be calculated by the input interrupt routine. Much pre-calculation can be done at the start of frame processing to minimize the work of the input interrupt. This will be described in more detail with reference to FIG. 11.

Still referring to FIG. 8, following an input buffer full condition, the breakpoint can be used to detect when the buffer fullness drops below a certain level by placing a breakpoint for an address that is a selected distance from the current position of the read pointer. The handler for this interrupt can then re-enable buffer input.

Two additional data breakpoint registers, similar to register 810 in FIG. 8, are associated with writes to bit-stream input buffer 114 and output functions of PCM interface 140. These are used to signal the end of a DMA transfer condition. In the case of the input buffer write function, there are again several possible sources of events, including buffer full and buffer circular wraparound. These can be managed using the same techniques as for buffer read. The PCM is the simplest of the three, as its function in normal operation is completely predictable and has only one possible event, the end of a PCM data block.

Figure 11A:
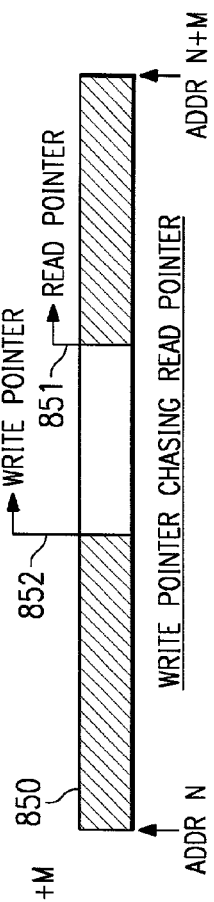
FIG. 11A illustrates a data buffer pointer configuration in which a read pointer is chasing a write pointer.
Figure 11B:
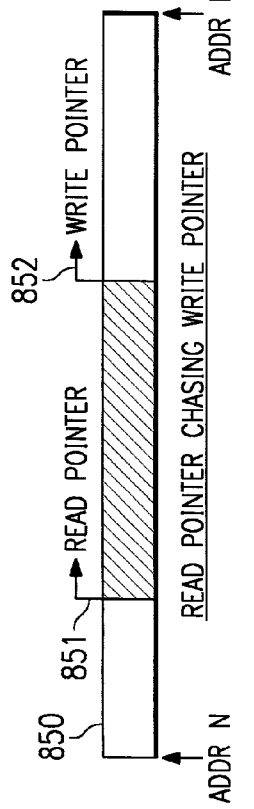
FIG. 11B illustrates a data buffer pointer configuration in which a write pointer is chasing a read pointer.

As indicated above, input buffer flow control is an important aspect of the present invention. Input buffer management involves the generation of the input buffer full and empty flow control signals, and the circular wrap-around of a buffer read pointer and a buffer write pointer. The two functions are related, as the relative positions of the read and write pointers in the input buffer determine which of the flow control conditions are possible. Two configurations are possible for the read and write pointers; the write pointer ahead of the read pointer in physical memory, and the reverse. FIGS. 11A and 11B illustrate these possibilities. FIG. 11A illustrates a data buffer pointer configuration in which a read pointer 851 is chasing a write pointer 852, and FIG. 11B illustrates a data buffer pointer configuration in which write pointer 852 is chasing read pointer 851. Read pointer 851 and write pointer 852 are typically stored in index register file 221 (FIG. 3).

Figure 12:
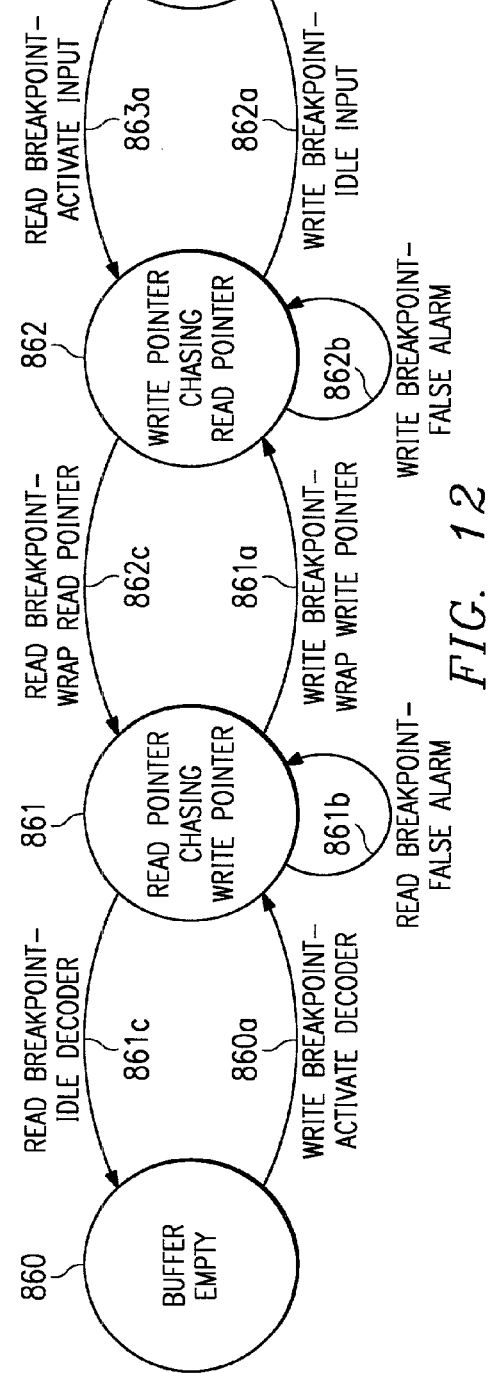
FIG. 12 illustrates a state diagram for managing an input buffer using aspects of the present invention.

FIG. 12 illustrates a state diagram for managing input buffer 114. Four states can occur: buffer empty 860, read chasing write 861, write chasing read 862, and buffer full 863. Only when the read pointer is "chasing" the write pointer is a buffer empty condition possible, which occurs on state transition 861c. Similarly only when the write pointer is chasing the read pointer is a buffer full condition possible, which occurs on state transition 862a. Buffer full and empty conditions are detected by establishing read and write breakpoints in the input buffer that trigger just before one pointer reaches the other. When such a breakpoints occurs, the pointers must be examined to see whether the leader has moved further forward since the breakpoints were set. This represents a "false alarm" condition, indicated by state transition 861b and 862b, and the correct action is to establish a breakpoint further forward and remain in the same state. If the pointer has not moved, then part of the system must shut down (state transitions 861c and 862a) and wait for the condition to clear by a sufficient margin. This can be detected using breakpoints again, as indicated by state transition 860a and 863a.

Figure 13:
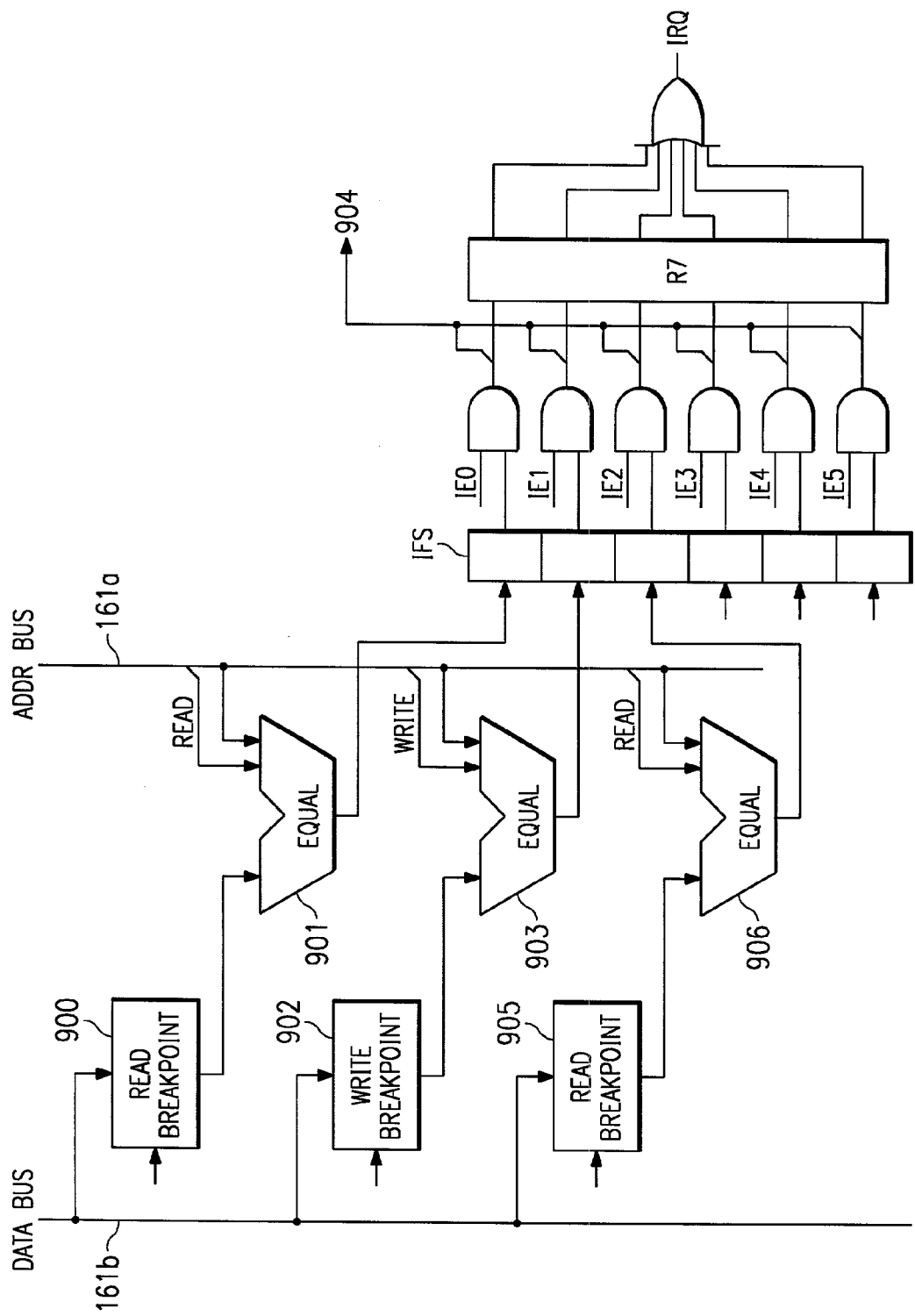
FIG. 13 is a schematic of a breakpoint circuit, according to the present invention.

FIG. 13 is a schematic of a breakpoint circuit, according to the present invention. Read breakpoint register 900 is connected to data bus 161b so that it can be loaded with a read breakpoint address. Likewise, write breakpoint register is connected to data bus 161b so that it can be loaded with a write breakpoint address. Both registers are memory mapped in the address space of address bus 161a. A comparator 901 is connected to the output of register 900 and to address bus 161a and is operable to compare addresses placed on the address bus to the value of the read breakpoint address stored in register 900. When an address which is equal to the read breakpoint address is detected during a read transaction, this condition is stored in a bit in interrupt flag shadow register IFS. If interrupt enable signal IE0 is true, then an interrupt request is formed and stored in status register R7. An interrupt request signal IRQ which is the "OR" of all enabled pending interrupts is formed by gate 904 and sent to interrupt logic 240, on FIG. 3. Status register R7 is described in more detail later.

A comparator 903 operates in a similar manner with write breakpoint register 902. A separate bit in status register R7 is used to record a write breakpoint interrupt so that software executing on BPU 110 can respond to read and write breakpoint interrupts appropriately. BPU 110 checks status register R7 in response to an interrupt request in order to determine the source of the interrupt. This is done via bus 907 which is connected to ALU 202, in FIG. 3.

Status register R7 can be read and written by BPU 110 just as any other register in register file 201. As discussed above, various bits in register R7 is also set by pending interrupt requests and by various status conditions. Table 2 defines the bits in R7.

TABLE 2

Status Register Bits

| BIT | MNEM | DESCRIPTION |
|---|---|---|
| 0–5 | IF | interrupt pending flags |
| 6–11 | IE | interrupt enable flags |
| 12 | ID | interrupt disable flag |
| 13 | C | carry |
| 14 | Z | zero |
| 15 | N | negative |

There are six sources of interrupts in BPU 110. These are vectored to a single master interrupt handler which examines the interrupt flags and branches to the appropriate handler. The six sources are:
input buffer read breakpoint
input buffer full—write breakpoint
PCM output buffer empty (a read breakpoint similar to input read breakpoint)
I²C Interface operation
arithmetic unit operation complete
real-time failure Status register R7 contains all the interrupt control bits. A single global interrupt disable bit (ID) optionally prevents interrupts from being acknowledged. Individual interrupt enable (IE0–5) bits enable or disable each source if interrupts are enabled globally. Finally, individual interrupt flags (IF0–5) indicate whether an interrupt is pending for each source.

The IF bits which appear in the status register are the logical "and" of the internal interrupt pending bit (the IF bit "shadow"—IFS) and the IE bit for the source. Additionally, a single bit I/O enable register (EN) globally enables and disables interrupts and DMA. This provides a way to protect critical sections of code against background operations with low overhead.

When one or more interrupt requests occur during a cycle, the following events occur:
1. if the IFS bit for a requesting interrupt is set, this indicates that an earlier interrupt of the same type has not yet been serviced. A real-time failure interrupt request is generated in this case.
2. each requesting interrupt sources' IFS bit is set.
3. if the ID bit is set or all requesting interrupts are disabled via an IE bit, or the EN bit is clear, no further action is taken.
Otherwise:
4. the PC is copied to an interrupt return address (RET) register which is a memory mapped register (not shown).
5. the ID bit is set in the status register so that further interrupts are disabled.
6. address 2 is loaded into the program counter register, which is located in index register file 221. This is the address of the master interrupt handler.

It is the task of the interrupt handler to clear the IF bit for each serviced interrupt, and clear the ID bit on exit to re-enable interrupts. Pending interrupts whose IF bit is was not cleared by the handler will re-interrupt when the ID bit is cleared. By re-enabling interrupts during the delay slot of the return branch, nesting of interrupts can be prevented.

The six IF bits appear in the least significant bits of the status register. These can be used to index a branch table to vector to a requesting interrupt's handler. Because the IF flags for all enabled interrupts appear in the index, this table also encodes the priority for when multiple interrupts occur simultaneously.

When manipulating a copy of the status register, for example when clearing the interrupt disable bit, there is the possibility of erasing the interrupt flags of requests that occur between the status read and reload. To avoid this the IF bits are given a special interpretation when loading. If an IF bit in the load source is set to one, the corresponding IF bit of the status register is cleared. If the bit is zero then the IF bit is unchanged. Therefore when saving and restoring the status register in an interrupt routine, it is necessary to set all IF bits in the copy to zero before reloading it, unless that interrupt is explicitly required to be reset.

When loading the status register to clear the IF bit for some source, an interrupt request for that source could occur simultaneously. In this case, the bit is not cleared, so the interrupt is not lost. This does not trigger a real-time failure interrupt request.

There is no stack data processing in device 100. Interrupts are handled by a one-level memory mapped interrupt return address register RET, not shown. Interrupt nesting is handled by copying the return address to a private memory location. Subroutines are handled by explicitly passing the return address in the register file. These methods are straightforward when the interrupt handler or subroutine is non-re-entrant.

Fabrication of data processing device 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual devices which may be sold as bare die or packaged. After packaging, finished parts are biased into an operational state and tested for operational functionality.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A data processing system, comprising:
   a data processing device for processing a stream of data, wherein the data processing device comprises:
   a first memory circuit operable to hold a portion of the stream of data, the memory circuit having an address port and a data port;
   a second memory circuit operable to hold a sorted list of a plurality of breakpoint addresses, the plurality of breakpoint addresses each corresponding to an address within the first addressable memory circuit;
   a first register operable to hold one of the breakpoint addresses;
   a first comparison circuit connected to the address port of the first memory circuit and to the first register with a breakpoint interrupt request output, the first comparison circuit operable to compare an address provided to the address port with the breakpoint address held in the first register, the first comparison circuit being further operable to assert a breakpoint interrupt request on the interrupt request output when the address is equal to the breakpoint address;
   a third memory circuit for holding a plurality of software routines; and
   a processing unit connected to the first memory circuit, to the second memory circuit, to the third memory circuit, and to the first register, with an interrupt input connected to the breakpoint interrupt request output; the processing unit operable to form the sorted list of breakpoint addresses, to load the register with a selected breakpoint address from the sorted list, to process data read from the first memory circuit using at least one of the plurality of software routines, to respond to an interrupt signal asserted by the first comparison circuit, and to select a different one of the software routines for processing the data from the first memory in response to the breakpoint interrupt.

2. The data processing device of claim 1, wherein the sorted list comprises one or more breakpoint addresses which point to a different type of data block within the stream of data.

3. The data processing device of claim 2, wherein the processing unit is operable to include an additional breakpoint address in the plurality of breakpoint addresses and to resort the sorted list so that the sorted list is in a circularly sequential order with respect to a read pointer address value.

4. The data processing device of claim 1, further comprising:
   a second register operable to hold a write breakpoint address;
   a second comparison circuit connected to the address port of the first memory circuit and to the second register with a write breakpoint interrupt request output, the second comparison circuit operable to compare a write address provided to the address port with the write breakpoint address held in the second register, the second comparison circuit being further operable to assert a write breakpoint interrupt request on the interrupt request output when the write address is equal to the write breakpoint address; and
   wherein the first comparison circuit is operable to compare only read addresses provided to the address port with the breakpoint address held in the first register.

5. The data processing device of claim 4, wherein the first memory circuit is a first portion of a larger memory circuit.

6. The data processing device of claim 5, wherein the second memory circuit is a second portion of the larger memory circuit.

7. The data processing device of claim 5, wherein the sorted list comprises a breakpoint address which points to the end of the first portion of memory.

8. The data processing device of claim 5, wherein the sorted list comprises a breakpoint address which points to a write pointer address.

9. The data processing device of claim 5, wherein the write breakpoint address points to a read pointer address or to the end of the first portion of memory.

10. The data processing system of claim 1 being an audio reproduction system, further comprising:
    means for acquiring a stream of data which contains encoded audio data;
    the data processing device for processing the stream of data being connected to the means for acquiring, the data processing device operable to form at least one channel of PCM data on an at least one device output terminal;
    a digital to analog converter connected to the output terminal operable to convert the channel of PCM data to an analog audio signal on a D/A output terminal; and
    a speaker subsystem connected to the D/A output terminal.

11. The audio reproduction system of claim 10, wherein the means for acquiring comprises a satellite broadcast receiver.

12. The audio reproduction system of claim 10, wherein the means for acquiring comprises a digital disk player.

13. The audio reproduction system of claim 10, wherein the means for acquiring comprises a cable TV receiver.

* * * * *